United States Patent [19]

Aditya et al.

[11] Patent Number: 5,892,925

[45] Date of Patent: *Apr. 6, 1999

[54] METHOD OF COMMUNICATING DATA FROM A HOST TO A NETWORK CONTROLLER

[75] Inventors: Vikas Aditya; Prakash Iyer, both of Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 968,400

[22] Filed: Nov. 12, 1997

Related U.S. Application Data

[62] Division of Ser. No. 541,925, Oct. 10, 1995, Pat. No. 5,729,681.

[51] Int. Cl.⁶ .............................. G06F 9/00; G06F 13/38
[52] U.S. Cl. ............................... 395/200.6; 395/200.43; 395/200.5; 395/200.66; 395/200.75; 395/200.8
[58] Field of Search .......................... 395/200.6, 200.58, 395/200.49, 200.52, 200.43, 200.5, 200.66, 200.75, 200.8; 370/469

[56] References Cited

U.S. PATENT DOCUMENTS

| | | | |
|---|---|---|---|
| 5,265,239 | 11/1993 | Ardolino | 395/200.58 |
| 5,278,834 | 1/1994 | Mazzola | 370/469 |
| 5,355,453 | 10/1994 | Row | 395/200.49 |
| 5,557,748 | 9/1996 | Norris | 395/200.52 |
| 5,729,681 | 3/1998 | Aditya et al. | 395/200.6 |

OTHER PUBLICATIONS

A Refine Cut–Through Buffer Management Scheme for layered Protocol Sta'cks by Yuh–Ming Huang et al.; IEEE Comm., Mar. 1994 pp.82–85.

*Primary Examiner*—Mark H. Rinehart
*Attorney, Agent, or Firm*—Blakely, Sokoloff, Taylor & Zafman LLP

[57] ABSTRACT

The basic invention is to define the TBD data structure in the driver layer to be exactly the same as the pointer structure in the TCB fragment structure and to have the TBD pointer in the TxCB point to the TCB fragment structure which is in protocol space. Also, the driver must specify at initialization that physical addresses be loaded into the TCB fragment pointers. This structure then allows the elimination of the TBDs in driver space. They are replaced by the TCB fragment structure. The advantages are that many cpu instructions formerly needed to set up the TBD's and to manage them in memory are eliminated. Also, it is faster to send the fragment structure to the controller than to send the TBDs. This is because the fragment structure is a contiguous array and can therefore go to the controller in burst mode.

9 Claims, 8 Drawing Sheets

METHOD OF COMMUNICATING DATA FROM A HOST TO A NETWORK CONTROLLER

This is a divisional of application Ser. No. 08/541,925, filed Oct. 10, 1995, issued on Mar. 17, 1998 as U.S. Pat. No. 5,729,681.

CROSS-REFERENCE TO RELATED APPLICATIONS

Please refer to co-pending application Ser. No. 08/526,714 filed on Sep. 11, 1995 by Aditya and Iyer, entitled SUPER PIPELINED ARCHITECTURE FOR TRANSMIT FLOW IN A NETWORK CONTROLLER and assigned to the same assignee as the present invention.

BACKGROUND OF THE INVENTION

1. Field of the Invention.

The present invention relates to bus mastering network controllers. More particularly, it relates to a simplified interface between a host and a network controller that allows the optimization of transmission of data from the lower protocol layer in the host across the system bus to the buffer memory in the controller which reduces CPU utilization and increases data transfer rates.

2. Description of the Prior Art.

A computer network is a system of hardware and software that allows two or more computers to communicate with each other. Networks are of several different kinds of which the most important are: local area networks ("LAN") campus networks, metropolitan area networks, ("MAN") wide area networks ("WAN") and enterprize networks.

Figure 1:
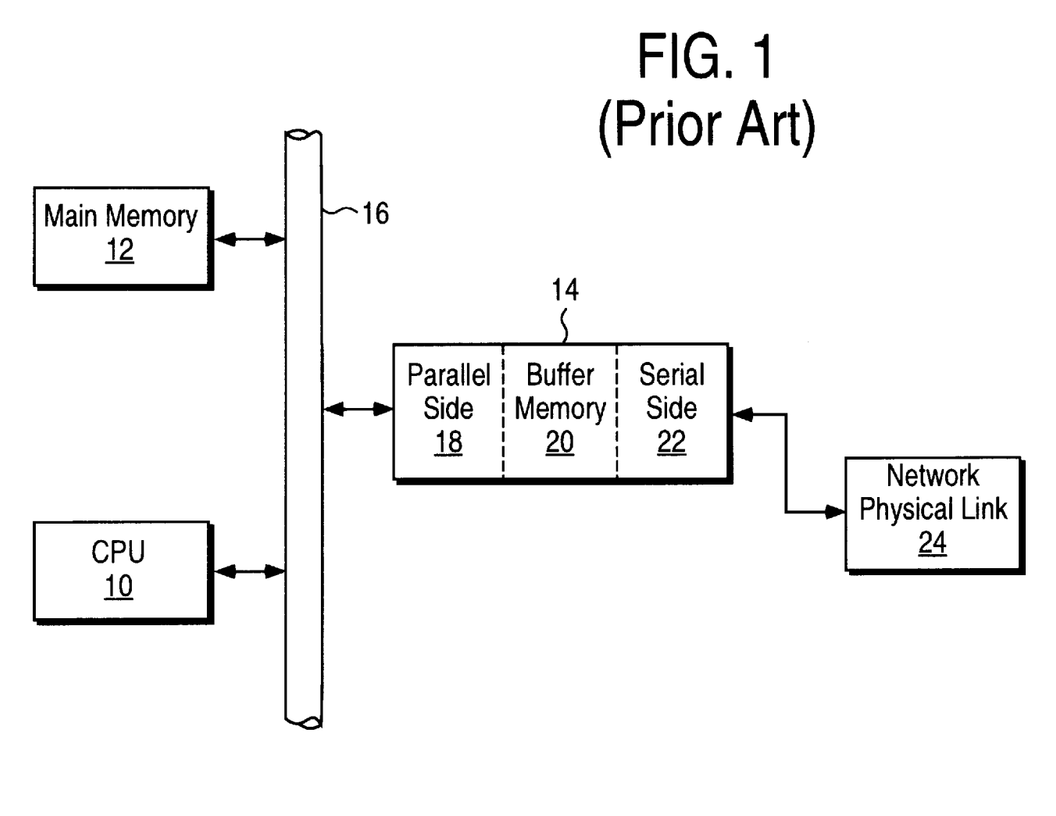
FIG. 1 is a block diagram of the general setting of the invention.

FIG. 1 is a block diagram of the general setting of the invention. Referring now to FIG. 1, a CPU 10, a main memory 12 and a bus mastering network controller 14 are connected to system bus 16.

Bus mastering network controller 14 is a class of network controllers that is capable of transferring data from main memory directly without requiring any interaction by the host CPU. In order to do this, bus mastering controller 14 gains control of system bus 16 and reads or writes data directly to and from main memory 12. Bus mastering network controller 14 consists of a parallel side 18, a buffer memory 20 and a serial side 22. Parallel side 18 is connected to system bus 16 and serial side 22 is connected to network physical link 24. Bus mastering network controller 14 is specific to a particular type of network such as Ethernet, token ring, etc and provides the attachment point for the network physical link such as coaxial cable, fiber optic cable, wireless (where an antenna and base station are needed), etc. If the physical link is linear, such as Ethernet, a carrier sense multiple access/collision detection (CSMA/CD) system is used in which a node sends a signal that every other node detects but only the addressed node interprets as useful data. If two nodes send signals at the same time, a collision occurs and both backoff, wait for a unique random amount of time and then try again. A bus mastering network controller is described in more detail in the co-pending application referenced in the first section hereof.

Network communications are made possible by the addition of a network controller and physical link to a computer and by a network operating system ("NOS") located in each computer on the network. A NOS has an architecture which is typically layered. A layered architecture specifies different functions at different levels in a hierarchy of software and hardware functions. A typical layered architecture can be conceptualized as having five layers: an application layer at the top of the hierarchy followed by an upper protocol layer, a lower protocol layer, a driver layer and finally a physical layer which consists of a controller and the physical link. When the networking protocol stack is initialized, all layers bind to each other. That is, communication is established between layers by specifying buffer addresses and function entry points. As illustrated in FIG. 1, the physical layer consists of controller 16 and physical link 24. For each computer on the network, all of the layers of the protocol stack except the physical layer reside in the CPU and main memory. The controller is connected to the CPU and main memory over the system bus.

Figure 2:
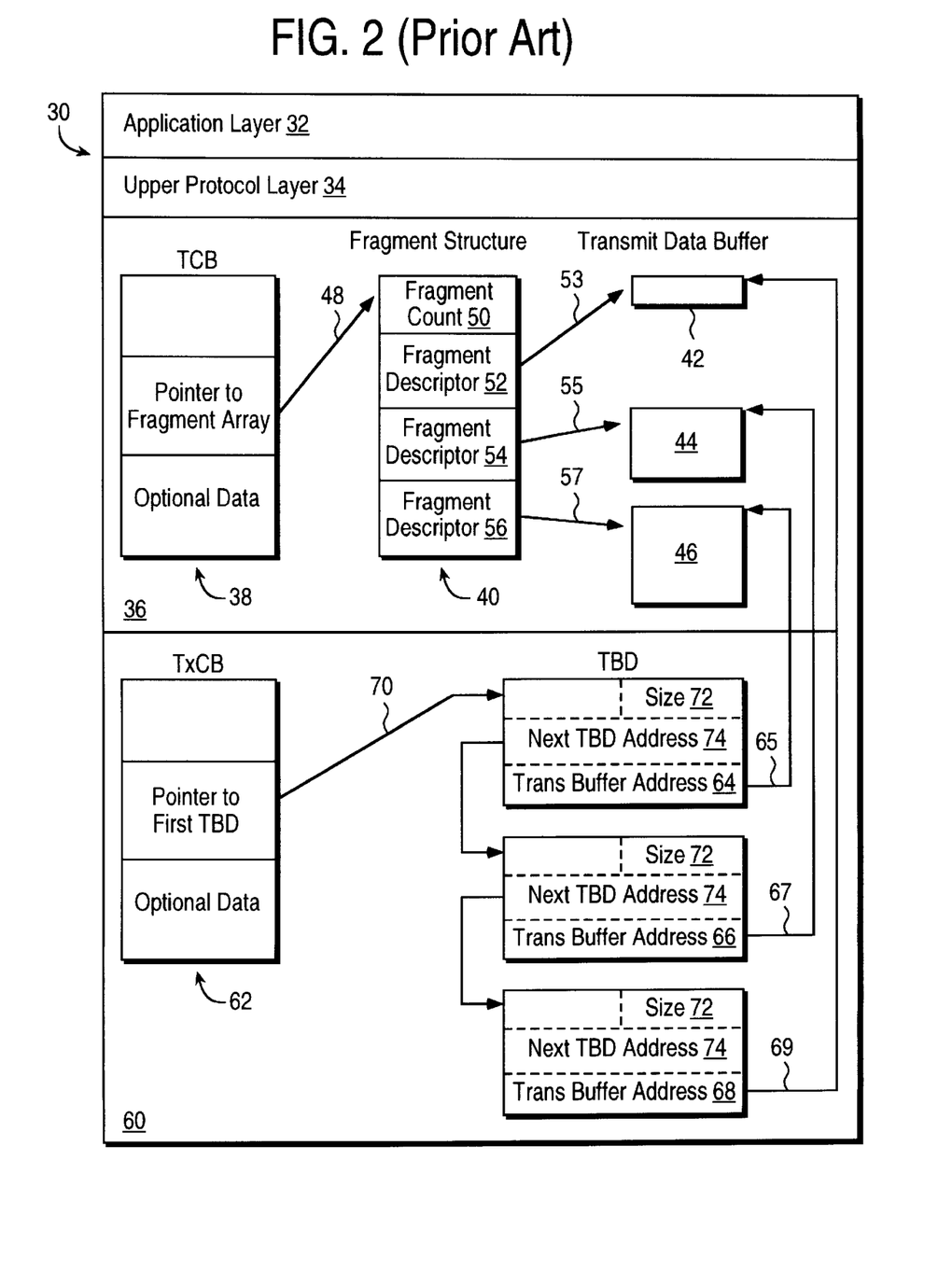
FIG. 2 is a block diagram of prior art protocol stack which shows the structures and relationships created in the lower protocol layer and the driver layer.

FIG. 2 is a block diagram of a typical NOS protocol stack and emphasizes the structures and relationships created in the lower protocol layer and the driver layer. The physical layer consisting of controller 14 and network physical link 24 of FIG. 1 are not shown. The lower protocol layer data structures and their names are those of the NETWARE network operating systems. NETWARE is a trade name of Novell, Inc.

Referring now to FIG. 2, a protocol stack 30 has a top layer 32 typically called an application layer. The application layer is the user interface layer of protocol stack 30. It is the layer in which the data to be transmitted is created. For example, the user interface layer may be a word processor and the data to be sent is a file that was created by the user with the word processor.

Immediately below application layer 32 is upper protocol layer 34. Upper protocol layer 34 does error checking, handshaking and in some cases compression. Upper protocol layer 34 also specifies the destination of the data to be transmitted and passes the data to be transmitted to lower protocol layer 36 in predetermined quantities called packets. This is because lower protocol layer 36 cannot handle an unlimited amount of data at any given time.

Immediately below upper protocol layer 34 is lower protocol layer 36. Lower protocol layer 36 includes the communications services which are a set of conventions which define how communication over a network will be structured. In general, data passed from upper protocol layer 34 as packets are broken down further by lower protocol layer 36 into frames. A frame is a data structure for transmitting data over a serial communication channel and typically includes a flag that indicates the start of the frame followed by an address, a control field, a data field and a frame check sequence field for error correction. The data field may be either fixed or variable. In the case of Ethernet, the frame is of variable size with a maximum size of 1,514 bytes. In performing these functions, lower protocol layer 36 establishes a set of descriptor, buffer and control fields in a dedicated portion of main memory called lower protocol space which is illustrated schematically in FIG. 2 as the space in which the various data structures reside. Within lower protocol space there are two types of data structures. They are transmit control blocks ("TCB") with their associated fragment structures and transmit data buffers. TCBs and TCB fragment structures are used to transfer data from the lower protocol layer via a driver layer (to be described later) to the controller. When sending a frame of data, the upper protocol layer assembles a list of fragment pointers and passes them to the lower protocol layer where a TCB and TCB fragment structure are constructed. The TCB consists of header type information. The TCB fragment structure consists of pointers to actual data in main memory to be transmitted. In FIG. 2, the TCB is indicated by reference numeral 38 and the TCB fragment structure is indicated by reference numeral 40. A field in TCB 38 points to the address of fragment structure 40 as illustrated by arrow 48. Fragment structure 40 consists of a first field 50 consisting of four bytes and containing the count of the number of data fragment descriptors 52, 54 and 56 (in this case 3 for example) contained in fragment structure 40. Each fragment descriptor contains a pointer field and a size field. Each pointer field contains the address of the first byte of a transmit data buffer. For example, the pointer field in fragment descriptor 52 contains the address of the first byte in transmit data buffer 42. This is illustrated in FIG. 2 by arrow 53. The size field in fragment descriptor 52 contains the size in bytes of transmit data buffer 42. In like fashion, the pointer field in fragment descriptor 54 contains the address of the first byte in transmit data buffer 44 which is illustrated in FIG. 2 by arrow 55, and the size field in fragment descriptor 54 contains the size in bytes of transmit data buffer 44. The same holds true for fragment descriptor 56 and transmit data buffer 46. Fragment structure 40 may have any number of fragment descriptors. All fields in fragment structure 40 are contiguous in lower protocol space.

The transmit data buffer, in this case buffers 42, 44 and 46, are a set of contiguous memory locations in main memory that contain the actual user data to be transmitted over physical link 24 in FIG. 1. Transmit data buffers may be of any length and there may be any number. However, the data contained in all transmit data buffers referenced by all fragment descriptors contained in fragment structure 40 can be no larger than a frame of data. If the data to be transmitted is greater than one frame, multiple frames are sent. To do this, the lower protocol layer sets up multiple TCBs which are linked. One TCB and its associated TCB fragment structure are set up for each frame of data to be transmitted.

Immediately below lower protocol layer 36 is driver layer 60. Driver layer 60 is a software module that is specific to network controller 14 hardware. The purpose of a software driver in general is to isolate the hardware specific software functions in one module. This facilitates interchangeibility of hardware and software components designed by different organizations. Specifically driver layer 60 programs network controller 14 to carry out specific functions and transfers data between network controller 14 and lower protocol layer 36. To carry out these functions, a driver layer is divided typically into two functional parts: a memory management module that sets up and manages certain data structures in a dedicated portion of main memory 12 called driver space, and a transmit module which takes transmit requests from lower protocol layer 36 and programs network controller 14 hardware to carry out the actual transmission of a frame over network physical link 24. When driver layer 60 initializes, it allocates a portion of main memory 12 from the NOS and partitions this memory into data structures called transmit command blocks ("TxCB") and an associated chain of transmit data buffer descriptors ("TBD"). There are a predetermined number of each that are set up. In FIG. 2, a TxCB is indicated by reference numeral 62 and three TBDs are indicated by reference numerals 64, 66 and 68.

When a TCB is handed off from lower protocol layer 36 to driver layer 60, driver layer sets up a TBD for each transmit data buffer. A specified field in TxCB 62 points toward the first byte in a TBD, in this case TBD 64. This is illustrated by arrow 70. Each TBD includes, among other fields, a next TBD address field and a transmit data buffer address field. This field is required since the TBD address field is the address of another TBD. The TBDs are not in a contiguous array in driver space. Accordingly, if more than one TBD is used for a frame, a pointer to the location of the next TBD is required. The group of TBDs needed to transfer and entire frame is known as a chain of TBDs.

The transmit data buffer address field is the address of the first byte of a transmit data buffer in main memory. For example, the transmit data buffer address field in TBD 64 points to transmit data buffer 46 as illustrated by arrow 65 and the transmit data buffer address field in TBD 66 points to transmit data buffer 44 as illustrated by arrow 67. In like fashion, the transmit data buffer field in TBD 68 points to transmit data buffer field 46 as illustrated by arrow 69.

Figure 3:
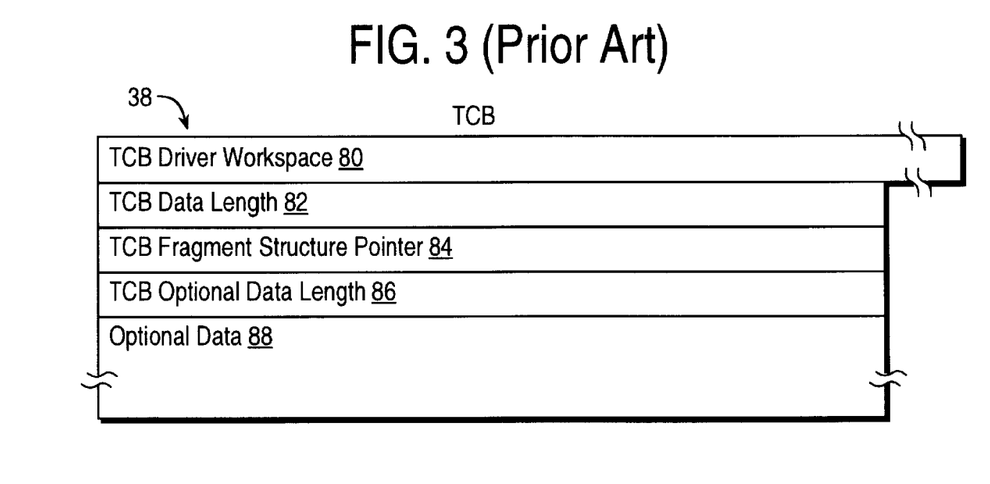
FIG. 3 is a block diagram of the structure of a prior art TCB.

FIG. 3 is a block diagram of the structure of TCB 38. Referring now to FIG. 3, TCB 38 consists of TCB driver work space field 80 which is 12 bytes in length and may be used for any purpose by driver layer 60 to control TCBs. The next field is TCB data length field 82. This field contains the length of data in the optional data portion of the TCB. The next field 84 is the TCB fragment structure pointer. This field contains a pointer to the first byte of fragment structure 40. The remainder of TCB 38 consists of the length of optional data 86 and the optional data field 88. Optional data field 88 immediately follows the TCB in memory. Length field 86 specifies the length of this field which may be zero.

Figure 4:
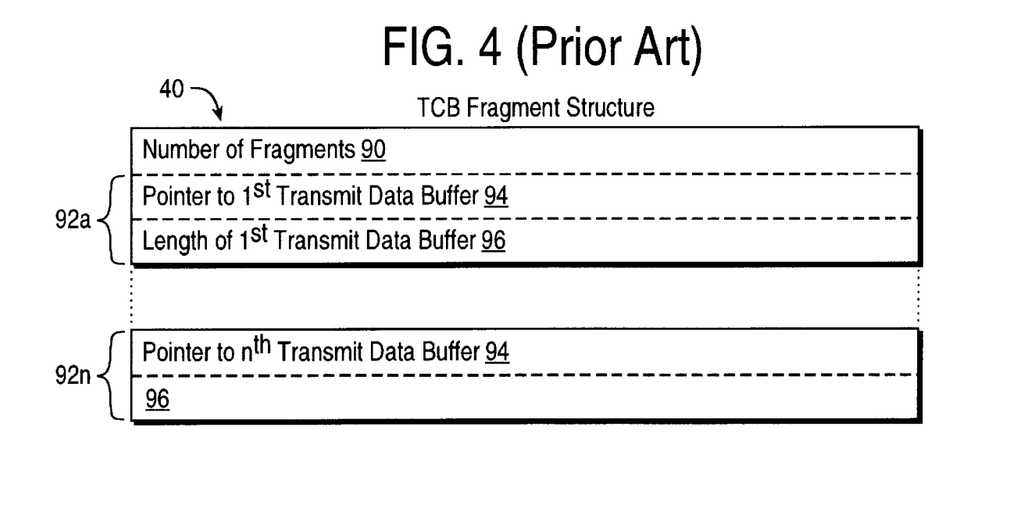
FIG. 4 is a block diagram of the structure of a prior art TCB structure.

FIG. 4 is a block diagram of the structure of TCB fragment structure 40. Referring now to FIG. 4, TCB fragment structure 40 consists of a number of fragments field 90 followed by any number of data fragment descriptors 92a through 92n. Each data fragment descriptor consists of two fields: a pointer field 94 that contains the address of the first byte of the first transmit data buffer and a length field 96 that specifies the length of the transmit data buffer to which pointer field 94 points. In the case of NETWARE, until recently, pointer field 94 contained a virtual address. Recently however, NETWARE has made it possible to specify that either a virtual or a physical address be loaded into pointer field 94 at initialization by setting a flag at that time. Number of fragments field 90 contains the number of data fragment descriptors that follow in the TCB fragment structure.

Figure 5:
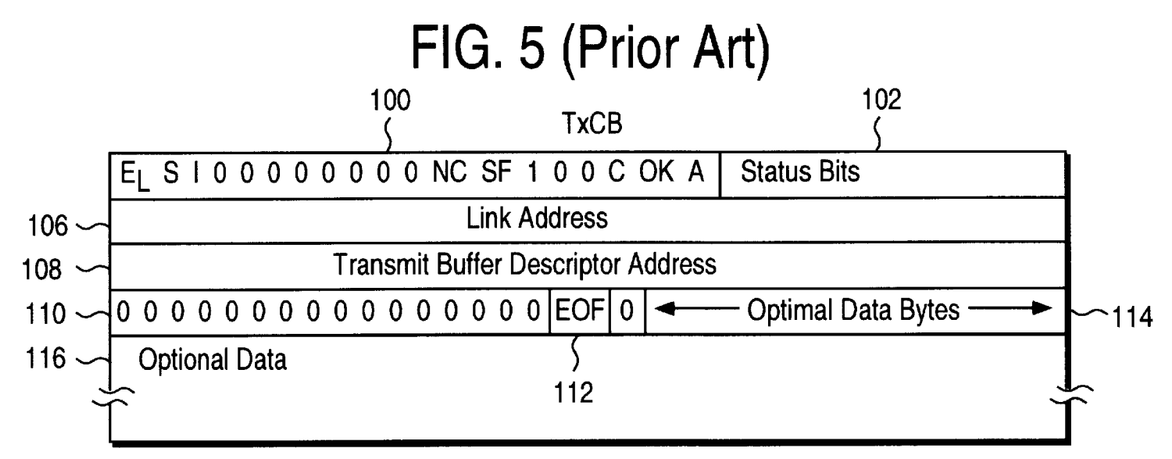
FIG. 5 is a block diagram of the structure of a prior art TxCB.

FIG. 5 is a block diagram of the structure of TxCB 62. Referring now to FIG. 5, field 100 consists of 16 bits that are various control bits used to issue transmit commands to network controller 14. Field 102 is a field of 16 bits that contains data on the status of the transmission of the frame associated with this TxCB over physical link 24. Field 106 is a link address to the next TxCB if the data to be transmitted exceeds one frame. If only one frame is required or this is the last frame to be sent, this field is set up as all ones. Field 108 is the TBD address. That is, this field points to the first byte in the first TBD. Field 110 is required to be all zeros. Field 112, called the end of frame ("EOF") field, is a one bit field that indicates if the entire frame is in the optional data portion of the TxCB. Field 114 gives the number of bytes in optional data field 116. Field 116 is the optional data field corresponding to field 86 in TCB 38 of FIG. 3.

Figure 6:
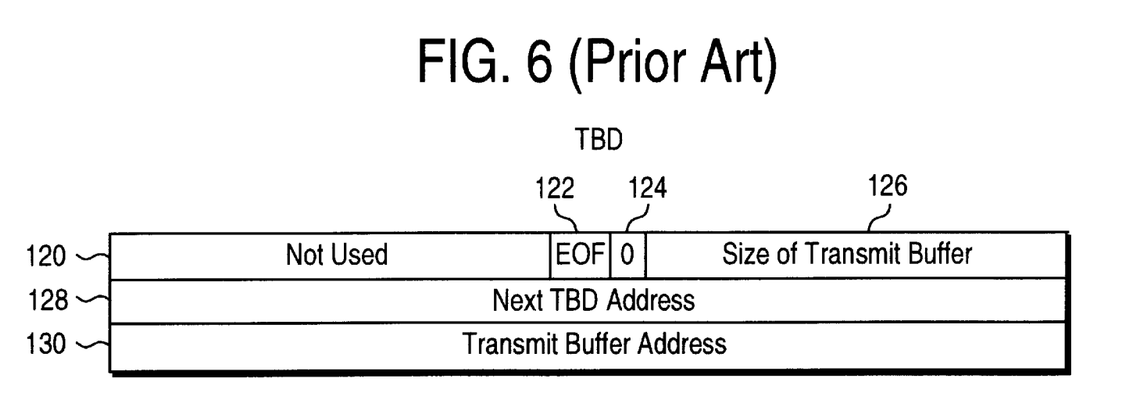
FIG. 6 is a block diagram of the structure of a prior art TBD.

FIG. 6 is a block diagram of the structure of TBD 72. Referring now to FIG. 6, field 120 consisting of 16 bits is not used and is all zeros. Field 122 is a one bit EOF field. This is set to 1 if this TBD is the last in a chain of TBDs needed to send an entire frame. Field 126 specifies the size of the transmit data buffer for which this TBD is a descriptor. Field 128 contains the address of the first byte of the next TBD in the chain of TBDs required for this frame. If there are no more TBDs required to send the fame, this field is all zeros and the EOF bit is 1. Field 130 contains the address of the first byte of the transmit data buffer for which this TBD is a descriptor. This address must be a physical address. Thus, if pointer field 94 contained a virtual address, it must be translated into a physical address before being sent to controller 14.

Immediately below the driver layer in the protocol stack is the physical layer. The physical layer is the hardware which includes network controller 14 and physical link 24.

When a bus mastering network controller is used, a data frame is communicated from CPU 10 to bus mastering network controller 14 by having driver layer 60 set up transmit data buffers and descriptors in main memory 12 that contain all of the information about the frame to be transmitted such as frame length, frame header and pointers to application data fragments. The bus mastering network controller is then able to transfer the data directly from application fragments 42, 44 and 46 in FIG. 2 directly to buffer memory 20 of controller 14 in FIG. 1 without requiring any data copy from CPU 10.

Figure 7:
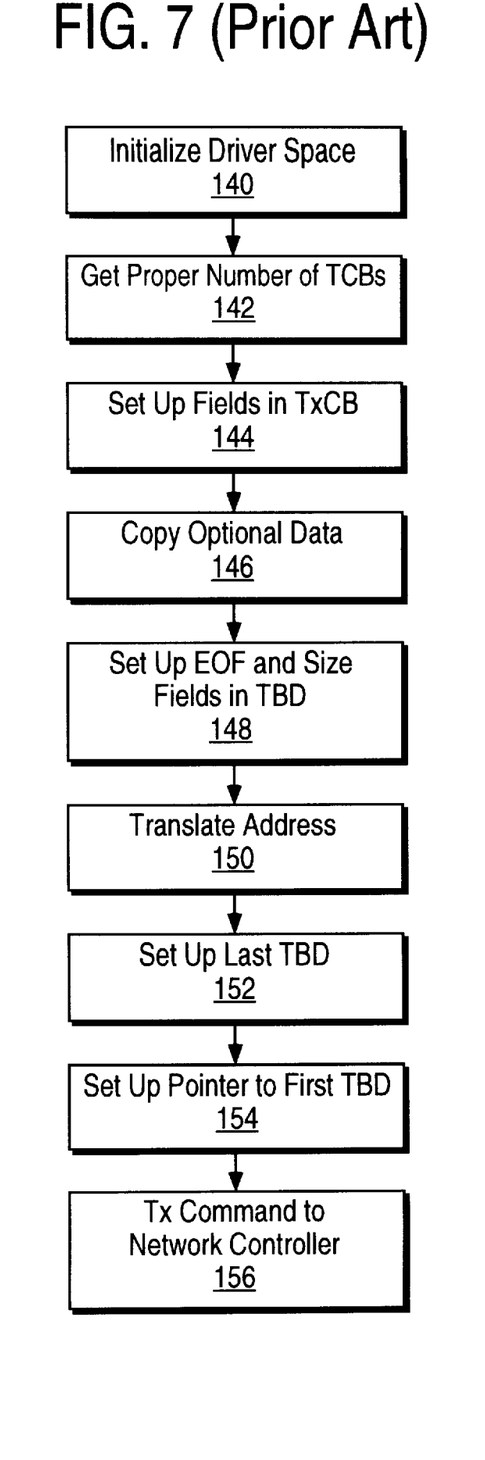
FIG. 7 is a flow chart of the method of the prior art.

FIG. 7 is a flow chart of the method according to the prior art. Referring now to FIG. 7, at process step 140, when driver layer 60 initializes, it allocates a portion of memory from the NOS and partitions this memory into a pool of TxCB's and a pool of TBD's. There are a predetermined and limited number of each in their respective pools.

Subsequently, at process step 142, when a frame is to be transmitted, the driver layer transmit module requests a TxCB from the memory management module of driver layer 60 that is not being used in connection with the transmission of a previous frame. If a free TxCB is available, it is allocated for use with the current frame. In addition, the memory management module of driver layer 60 allocates the appropriate number of TBD's which is determined by the number of fragment structure pointers in the TCB. The appropriate number of TBDs may not be immediately available if too many of the limited number of TBDs in the pool are being used for different frames. At process step 144, after the appropriate number of TBDs have been allocated, the driver layer transmit module then sets up the individual fields in TxCB 62. At process step 146, the transmit module copies any optional data that might be present in the TCB optional data field into the optional data field in the TxCB. At process step 148, the transmit module of the driver sets up the individual TBD's that will be associated with that frame. This process step includes setting up the size field 126, the EOF bit on the last TBD in the chain. At process step 150, the transmit module fetches the individual address of each fragment from the TCB fragment structure and causes the virtual address to be translated into a physical address by requesting a translation from the NOS. The new address is then copied into the TBD. This is done for every TBD associated with that TxCB.

At process step 152, the transmit module of the driver layer sets up the last TBD in the chain. This includes setting the next TBD address to all zeros and setting the EOF field to one. At process step 154, after the last TBD has been initialized, the transmit module of the driver layer sets up a pointer from the TxCB to the first TBD in the chain. At this point, the setup of the frame is complete and the driver then issues a transmit command ("Tx") to the network controller as indicated by process step 156. Upon receipt of the Tx command, controller 14 copies the fields of the TxCB to itself. In this way controller 14 is programmed.

The problems with the old structure and the process are as follows: First, the chain of TBDs are not a contiguous array of memory locations in main memory. Thus, a complete memory cycle must be initiated to access each separate TBD. And the initiation of a new memory cycle is a limit on burst mode transfer of data from main memory. A burst is a continuous transfer of data without interruption from main memory to a controller. In a multiplexing bus, burst mode provides an efficient way to dedicate the bus for the transmission of data from one source. Also, a move from one TBD to the next, is interpreted by the bus access controller to be a break point at which time other resources on the system bus may access the bus. That is, if there is contention for the bus, a bus master device must give up the bus which is also a reduction of the data transfer rate.

The second problem is that TBDs require memory management. The driver layer must have a memory management module that sets up TBDs for each frame to be transferred and reallocates them after a frame has been transferred.

The third problem is an increased risk of underruns. This is because of the break between transmission of discreet TBDs. During the break, a bus mastered controller may lose access to the system bus after the threshold has been reached.

SUMMARY OF THE INVENTION

The problems of the prior art are solved by the improved method of the present invention. This is a method of transmitting data from transmit data buffers in main memory in a host computer over a system bus to a buffer memory located in a bus mastering controller. The bus mastering controller has a parallel side connected to the system bus and a network physical layer. The host is operating under a NOS having a protocol stack which includes a lower protocol layer that provides a TCB and TCB fragment structure in the main memory and communicates with a driver layer which in turn communicates with the bus mastering controller. The improvement comprises the step of transferring the TCB fragment structure directly from main memory to the buffer memory in the bus mastering controller without the use of intervening data structures that point to transmit data buffers and which are set up and managed by the driver layer.

BRIEF DESCRIPTION OF THE DRAWING

The preferred embodiment of the invention will now be described in connection with the drawing in which.

DESCRIPTION OF THE PREFERRED EMBODIMENTS

An important element of the present invention is to recognize that if (1) the TBD data structure in driver space is designed to be exactly the same as the fragment pointer in the TCB fragment structure in protocol space, and (2) if the TBD pointer in the TxCB points to the TCB fragment structure, and (3) if the loading of physical addresses into the TCB fragment pointers is specified at initialization, then the TBD data structure in driver space can be eliminated and system performance thereby improved.

Figure 8:
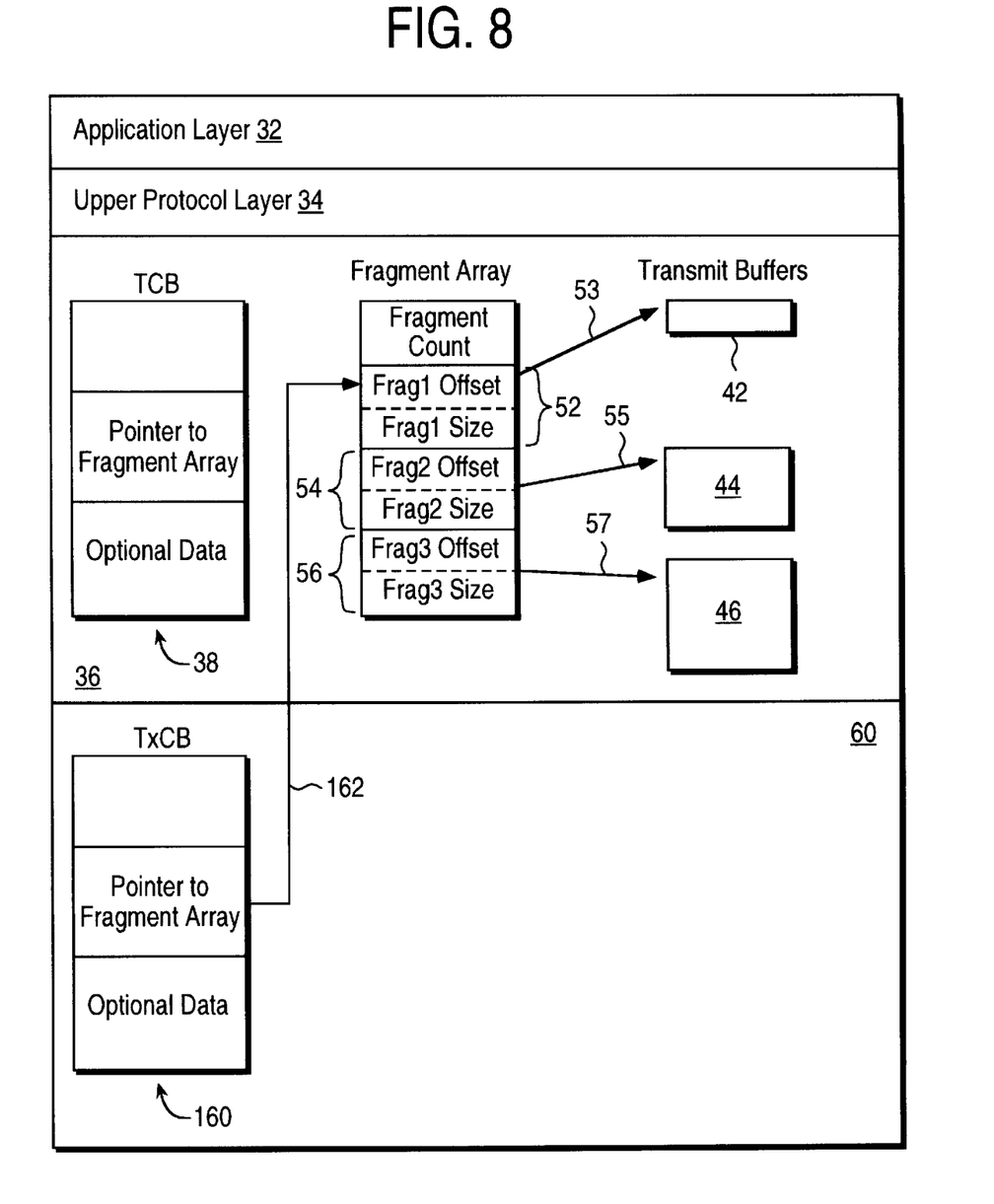
FIG. 8 is a block diagram of the protocol stack of the present invention with the data structures and relationships of the present invention in the lower protocol layer and the driver layer.

FIG. 8 is a block diagram of a conventional protocol stack but with the structures and relationships of the present invention in the driver layer. Referring now to FIG. 8, application layer 32, upper protocol layer 34 and lower protocol layer 36 with its structures are the same as those of FIG. 2. In driver space 60 however the data structures are different than those shown in FIG. 2. Specifically, only a pool of TxCBs is created in driver space at initialization time. And TxCB 160 is a different structure than TxCB 62 of FIG. 2. One of the differences is that the pointer field in TxCB 160 points not to the first of a chain of TBDs in driver space but to fragment structure 40 as illustrated by arrow 162.

Figure 9:
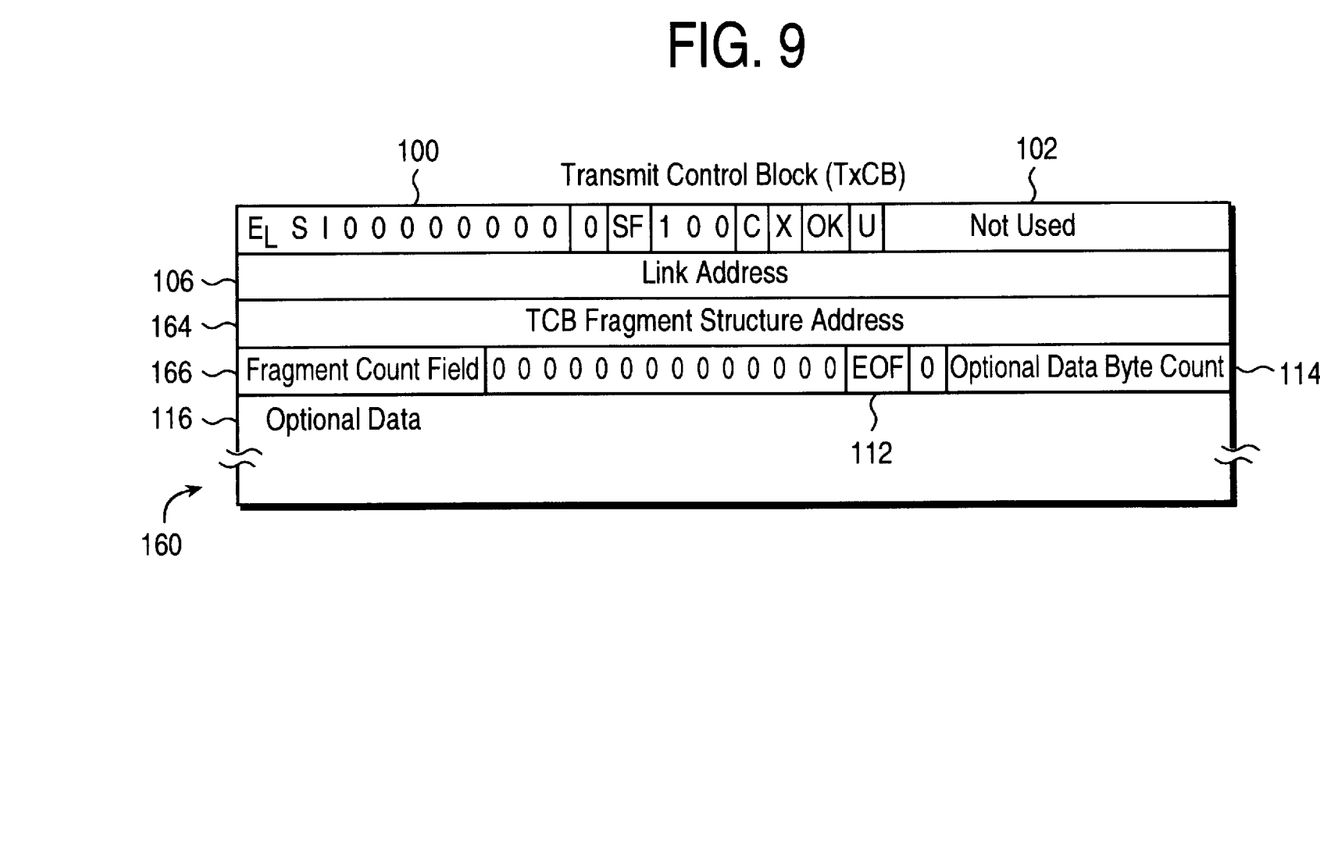
FIG. 9 is a block diagram of the structure of a TxCB according to the present invention.

FIG. 9 is a block diagram of the structure of TxCB 160. Referring now to FIG. 9, TxCB 160 includes a header field 100 which is the same as header field 100 in TxCB 62 of FIGS. 2 and 5. TxCB 160 also includes a status field 102 which is no longer used and thus has all bits set to zero. Controller 14 detects certain errors and other conditions relating to the transmission of a frame over the physical link such as the number of collisions that are experienced in excess of some predetermined number, the number of underruns and any kind of error encountered when the frame was being transmitted over the physical link. In the prior art, statistics on such conditions were stored in status field 102 after finishing transmission of an entire frame. and transferred back to the CPU. In the present invention, transmit statistics for completed frames are accumulated in statistics registers in controller 14. The NOS has access to such registers as required.

Link address 106 is the same for TxCB 160 and TxCB 62 of FIGS. 2 and 5.

Field 164 contains the address of the first byte of TCB fragment structure 40. This is instead of the address of the first byte in a chain of TBDs as in FIGS. 2 and 5. This is made possible by the redesign of the data structure to be transferred to controller 14.

Fields 112 and 114 in FIGS. 5 and 9 are the same. Field 166 in FIG. 9 contains the count of fragments in TCB fragment structure 40. The remaining fields of TxCB 160 and TxCB 62 are the same. The TxCB set out in FIG. 9 is the only structure transferred from driver layer 60 to controller 14. With this change, many improvements are possible. To start with, it is possible to eliminate the entire process relating to TBDs and use the TCB fragment structure in protocol space instead of a chain of TBDs in driver space. That is, the driver layer can merely pass the addresses of the first fragment descriptor 52 of TCB fragment structure 40 to fragment structure to controller 14. With this change, the function of the driver layer is greatly simplified.

Next, the EOF bit and the next TBD field are eliminated. Thus, it eliminates a substantial part of the overhead data associated with a transfer data buffer that must be transferred over the system bus 16 to controller 14.

Next, TCB fragment structure 40 is contiguous in main memory. Thus, by specifying the address of the beginning byte and the length of the array, the entire array can be passed over the system bus in burst mode and therefore substantially faster than if a memory cycle were required for each pointer.

Next, since each TCB fragment pointer contains not only the location of the fragment buffer but also its size, the driver and therefore the controller know in advance exactly the quantity of data that can be transmitted and therefore that entire quantity in burst mode. Thus up to an entire frame can be transferred in burst mode.

The advantages are that many CPU instructions formerly needed to set up and manage the TBDs in driver space are eliminated.

Figure 10:
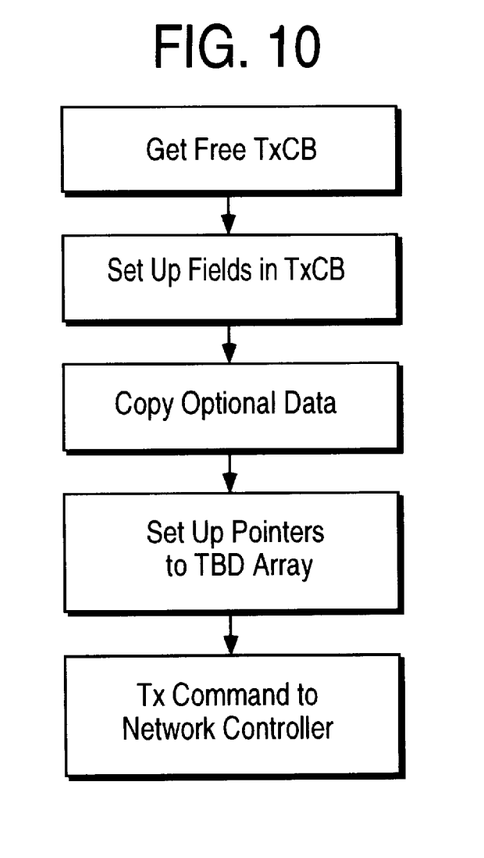
FIG. 10 is a flow chart of the process according to the present invention.

FIG. 10 is a flow chart of the process of the present invention. Referring now to FIG. 10, process step 170 takes place at the driver initialization time. In this step, the memory management module sets up a pool of TxCBs. This is the same as in the prior art. However, the memory management module of the driver no longer needs set up a pool of TBD's. Also at set up time, the transmit module of the driver layer specifies to the protocol layer that all pointer fields 90 in data fragment descriptors 92a–n be set up with physical addresses.

At process step 172, the individual fields of an allocated TxCB are set up. At process step 174, the driver layer 60 copies any optional data from the TCB header into the TxCB header.

The next two steps in the prior art, setting up the TBD's including the size and the translation of addresses, is eliminated. TBDs in driver space are no longer needed.

The step of setting up the EOF bit in the TBD is no longer required because there are no TBD's.

The steps of setting up the pointer from the TxCB to TBD array and issuing of the transfer command remain the same as the prior art.

The foregoing preferred embodiments are subject to numerous adaptations and modifications without departing from the concept of the invention. Therefore, within the scope of the appended claims, the invention may be practiced other than as specifically described herein.

What is claimed is:

1. An apparatus comprising:

a host computer having a CPU connected to a system bus;

a controller having a first side connected to said system bus and to a buffer memory and a second side connected to a network physical layer and to said buffer memory;

a main memory connected to said system bus and storing a network operating system having a protocol stack which includes a lower protocol layer that provides a data structure that locates data in main memory to be transmitted over said physical link and communicates with a driver layer which in turn communicates with said controllers, logic in said host for causing the loading of said lower protocol data structure with physical addresses at initialization; and logic in said host for causing said driver layer to create a single data structure that points directly to said lower protocol space data structure.

2. The apparatus of claim 1 wherein said single data structure comprises a TxCB which includes:

a header field;

a link address field;

an address field that points to said lower protocol space data structure;

a data fragment number field; and a optional data byte count field.

3. The apparatus of claim 1 further including logic for transferring said single data structure to said controller.

4. The apparatus of claim 1 wherein said network operating system is Netware and said lower protocol space data structure is a transmit control block and a transmit data block data structure.

5. The apparatus of claim 2 wherein said transmit command block is located in driver space.

6. An apparatus comprising:

a host computer having a CPU connected to a system bus;

a controller having a first side connected to said system bus and to a buffer memory and a second side connected to a network physical layer and to said buffer memory;

a main memory connected to said system bus and storing a network operating system having a protocol stack which includes a lower protocol layer that provides transmit control blocks, transmit control block fragment arrays and transmit data buffers in said main memory and communicates with a driver layer which communicates with said controller and which contains a transmit command block;

logic in said host for specifying the loading of said lower protocol data structure with physical addresses at initialization; and logic in said host for setting up a pointer in said transmit command block to said transmit control block fragment array; and logic in said host for issuing a transmit command.

7. The apparatus of claim 6 further characterized by logic for copying any optional data from said transmit control block to said transmit command block.

8. The apparatus of claim 6 wherein said transmit command block is created at initialization.

9. The apparatus of claim 6 wherein said network operating system is Netware.

* * * * *